United States Patent
Maesono et al.

(10) Patent No.: US 7,489,235 B2
(45) Date of Patent: Feb. 10, 2009

(54) MOTOR VEHICLE OPERATION INFORMATION PROVIDING SYSTEM

(75) Inventors: Noboru Maesono, Tokyo (JP);
Yasumichi Hagimori, Kanagawa (JP);
Tsutomu Kitagawa, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 130 days.

(21) Appl. No.: 10/519,746

(22) PCT Filed: Jul. 29, 2003

(86) PCT No.: PCT/JP03/09586

§ 371 (c)(1),
(2), (4) Date: Dec. 29, 2004

(87) PCT Pub. No.: WO2004/012166

PCT Pub. Date: Feb. 5, 2004

(65) Prior Publication Data

US 2005/0246079 A1  Nov. 3, 2005

(30) Foreign Application Priority Data

Jul. 30, 2002  (JP)  ............... 2002-222193

(51) Int. Cl.
*B60Q 1/00*  (2006.01)
(52) U.S. Cl. ............ 340/438; 340/439; 701/35; 701/24
(58) Field of Classification Search ............ 340/438, 340/439; 701/35, 24, 25, 29
See application file for complete search history.

(56) References Cited

U.S. PATENT DOCUMENTS 4,939,652 A * 7/1990 Steiner ................ 340/438
5,046,007 A * 9/1991 McCrery et al. ........ 340/425.5
5,465,079 A * 11/1995 Bouchard et al. .......... 340/439
5,550,738 A * 8/1996 Bailey et al. ............. 340/459
6,073,062 A * 6/2000 Hoshino et al. ........... 340/438
6,253,129 B1 * 6/2001 Jenkins et al. ............ 340/438
6,310,542 B1 * 10/2001 Gehlot ................ 340/426.25
6,438,472 B1 * 8/2002 Tano et al. ................ 701/36
2004/0153362 A1 * 8/2004 Bauer et al. .................. 705/1

FOREIGN PATENT DOCUMENTS

| CN | 1326875 | 12/2001 |
|---|---|---|
| JP | 60-43797 | 3/1985 |
| JP | 60-43797 | 2/1994 |
| JP | 2001-297138 | 10/2001 |
| JP | 2002-74592 | 3/2002 |
| JP | 2002-181179 | 6/2002 |

* cited by examiner

*Primary Examiner*—George A Bugg
*Assistant Examiner*—Eric M Blount
(74) *Attorney, Agent, or Firm*—Rabin & Berdo, PC

(57) ABSTRACT

A data collection controller 4 to and from which a removable memory 12 can be attached and removed is mounted on a vehicle 1, and is connected to a predetermined data storage 3. In the data collection controller, driver codes, service route codes, and the like can be entered with code setting buttons 8 and 9, while these code data and data in the predetermined data storage can be downloaded with a download button 7 into the removable memory. The downloading is performed every time the driving of the vehicle is completed. The removable memory is collected when a predetermined time period (for example, one month) has elapsed. Driving information for each driver and each service route is analyzed based on the data recorded in the collected removable memory.

17 Claims, 4 Drawing Sheets

(1) EXAMPLE OF SERVICE ROUTE CODE SETTINGS

| CODE NO. | SERVICE ROUTE |
|---|---|
| 0 | TOKYO-NAGOYA |
| 1 | NAGOYA-MATSUMOTO |
| 2 | MATSUMOTO-NIIGATA |
| 3 | NIIGATA-TOKYO |

(2) EXAMPLE OF DRIVER CODE SETTINGS

| CODE NO. | DRIVER |
|---|---|
| 0 | TANAKA |
| 1 | HAYAKAWA |
| 2 | YAMAMOTO |
| 3 | SUZUKI |

MOTOR VEHICLE OPERATION INFORMATION PROVIDING SYSTEM

TECHNICAL FIELD

The present invention relates to a driving information providing system for collecting and analyzing information about vehicle driving in order to increase the efficiency of the driving.

BACKGROUND ART

For those who use vehicles as means of transportation for work, leisure, or the like, information to ensure efficient driving (for example, information about fuel costs) is useful. Particularly for transport companies and the like having many commercial vehicles, the efficiency in driving, which will have impacts on costs and customer confidence, is a critical issue. The efficient driving means, for example, the driving requiring less fuel costs, causing no damage to the vehicle and goods loaded, and no traffic accident.

To achieve such an efficient driving, driving information is collected from vehicles after driving and analyzed for use in future driving.

FIG. 7 is a diagram showing a first example of a known driving information providing system intended for such use as described above. Referring to FIG. 7, reference numeral 1 denotes a vehicle, reference numeral 2 denotes a vehicle controller, reference numeral 3 denotes a predetermined data storage, reference numerals 20 and 21 denote connectors, reference numeral 22 denotes a cable, and reference numeral 23 denotes a notebook computer.

The vehicle controller 2 is a controller for controlling the driving of the vehicle 1. Together with various detection signals (for example, engine-revolution detection signals and vehicle-speed detection signals) from each part of the vehicle, operation signals from the driver (for example, acceleration operation signals, brake operation signals, and gearshift operation signals) are inputted into the vehicle controller 2. Based on these signals, various control signals (for example, fuel-injection control signals and gearshift control signals) are generated and outputted from the vehicle controller 2 to each part of the vehicle.

The predetermined data storage 3 is a storage device for selecting, as appropriate, data that are assumed to be associated with efficient driving (predetermined data) from data appearing in the vehicle controller 2, and recording the selected data. The connector 20 is a connector connected to the predetermined data storage 3.

Data (driving information) stored in the predetermined data storage 3 is collected as described below. That is, a staff member at an intermediary agent (for example, a vehicle dealer) for a data analysis center brings the notebook computer 23 to the vehicle 1, inserts the connector 21 for the cable 22 into the connector 20 for the vehicle to make connection with the predetermined data storage 3, extracts the data therefrom into the notebook computer 23, thereby collecting the data.

The staff member then brings the notebook computer 23 back to the intermediary agent, sends the collected data to the data analysis center, thereby having the driving information analyzed by the center.

In a second example of a known driving information providing system, removable memory cards prepared for each driver are collected to analyze driving information.

In this case, a driver inserts his/her own memory card into a predetermined vehicle-mounted unit at the beginning of vehicle driving to record data during the driving. On completion of the driving, the driver pulls out the memory card, inserts the memory card into a dedicated computer in a service office, such as a garage, to have the data read and analyzed by the computer.

A first problem with the first known example described above is that the collection of driving information requires time and effort, and a second problem is that driving information for each driver cannot be obtained.

A problem with the second known example described above is an increased cost, since a dedicated device for preparing a memory card for each driver and reading the memory card needs to be set up in each service office.

The first problem with the first known example will now be described. In this example, a staff member for collection goes to each vehicle and connects a notebook computer thereto for collecting data. Since dedicated personnel are required and it takes as long as 20 to 30 minutes per vehicle, time and effort are involved in collecting data.

The second problem with the first known example will now be described. Drivers of the same vehicle may vary from day to day, or may change during a single day. However, while driving information for each vehicle can be obtained, driving information for each driver cannot be obtained. Although transport companies and others often request for the analysis of driving information for each driver so that individual evaluation and instruction can be made, this example cannot meet such a request.

Finally, the problem with the second known example will be described. The dedicated device for writing and reading to and from a memory card for each driver is relatively expensive (for example, several hundreds of thousands of yen per device). Since the cost of installation at each service office and the cost of appropriate maintenance after the installation are required, the dedicated device in the second known example is considerably expensive.

The present invention aims to solve the problems described above.

DISCLOSURE OF INVENTION

An object of the present invention is to reduce the time and effort required for collecting driving information from vehicles after driving.

A further object of the present invention is to obtain driver information, service route information, and the like, as well as vehicle data, in collecting driving information from vehicles after driving.

A still further object of the present invention is to reduce the costs of collecting and analyzing driving information from vehicles after driving.

To achieve these objects, in a driving information providing system including a predetermined data storage for storing predetermined data from data appearing in a vehicle controller, wherein data is extracted from the predetermined data storage for the analysis of driving information, the driving information providing system of the present invention further includes a data collection controller connected to the predetermined data storage; and a removable memory that can be attached to and removed from the data collection controller. The data collection controller includes at least a code entry section for entering desired data in code; and a download section for downloading data entered in code and data in the predetermined data storage into the removable memory currently attached. The removable memory in which data is downloaded is collected and provided for the analysis of driving information.

In the predetermined data storage described above, data can be stored by a storage-saving-type data recording method. An example is a frequency-accumulation-type data recording method in which every time a data value detected at predetermined intervals falls within a predetermined range of data values, a detection count for the range is accumulated and recorded.

The above-described data to be entered in code is a plurality of data. For example, at least two of driver data, service route data, sender data, goods data, loading ratio data, and data for driving time periods can be entered in code (Note: loading ratio=(actual load)/(rated load)).

BEST MODE FOR CARRYING OUT THE INVENTION

Embodiments of the present invention will now be described in detail based on the drawings.

Figure 1:
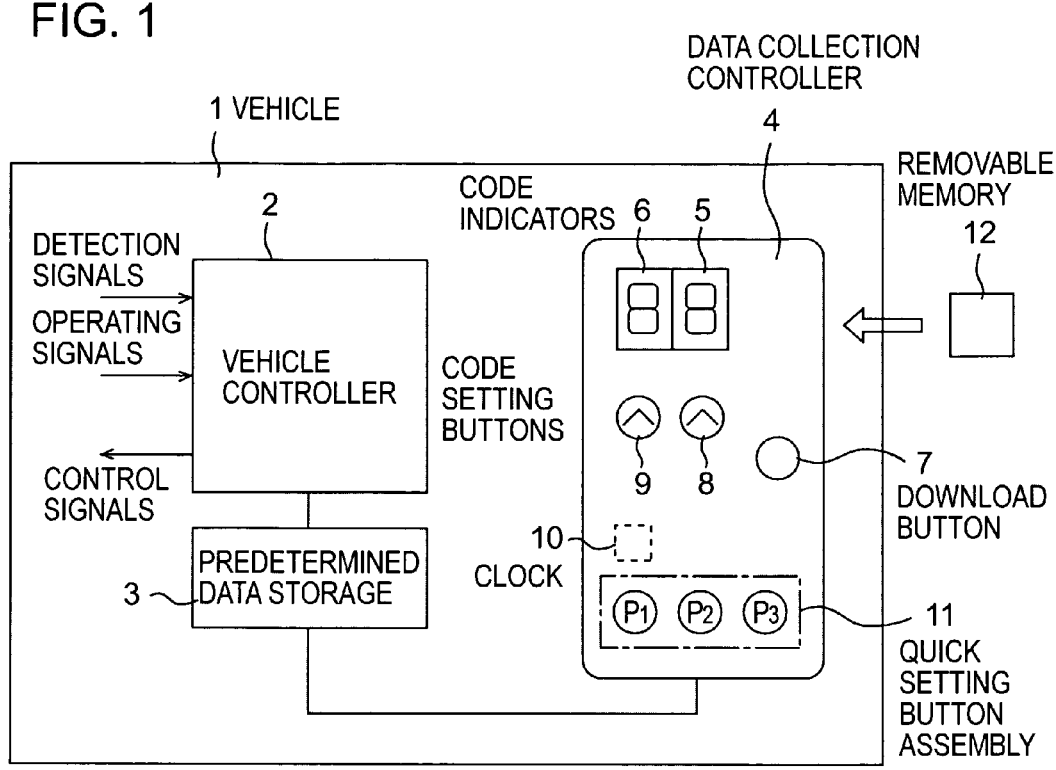
FIG. 1 shows the main part of a vehicle in the driving information providing system according to the present invention.
Figure 7:
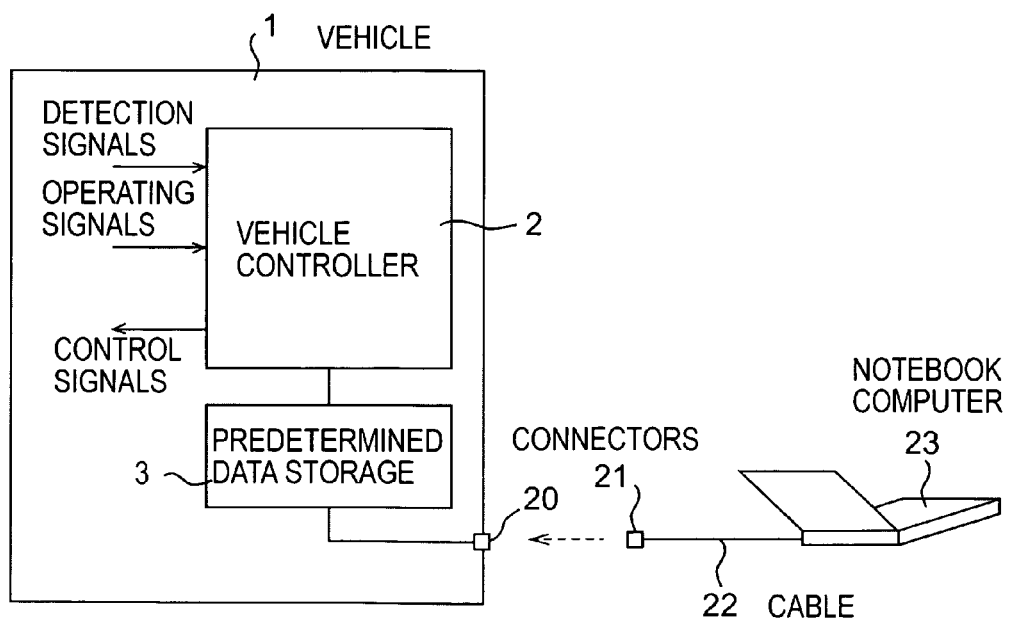
FIG. 7 is a diagram showing a first example of a known driving information providing system.

FIG. 1 shows the main part of a vehicle in the driving information providing system according to the present invention. Reference numerals correspond to those in FIG. 7. Reference numeral 4 denotes a data collection controller, reference numerals 5 and 6 denote code indicators, reference numeral 7 denotes a download button, reference numerals 8 and 9 denote code setting buttons, reference numeral 10 denotes a clock, reference numeral 11 denotes a quick setting button assembly, and reference numeral 12 denotes a removable memory. Reference numerals identical to those in FIG. 7 represent the same components. The clock 10 provides the current time.

First, an overview will be given. In the present invention, the vehicle 1 is provided with the data collection controller 4, which is connected to the predetermined data storage 3. The removable memory 12 can be attached to and removed from the data collection controller 4.

The data collection controller 4 has not only a function of adding driver information and service route information, but also a function of allowing these pieces of information and data stored in the predetermined data storage 3 to be downloaded to the removable memory 12.

Thus, when the removable memory 12 is pulled out and collected, driving information to which driver information and service route information are added can be collected. The detailed description will be given below.

The code setting button 8 is a button for setting code numbers of drivers, while the code indicator 5 is an indicator for displaying the code numbers set.

The code setting button 9 is a button for setting code numbers of service routes, while the code indicator 6 is an indicator for displaying the code numbers set.

At each press of the code setting button 8 and 9, code numbers are incremented, for example, from 0, 1, 2, to 3.

Figures 4, 5:
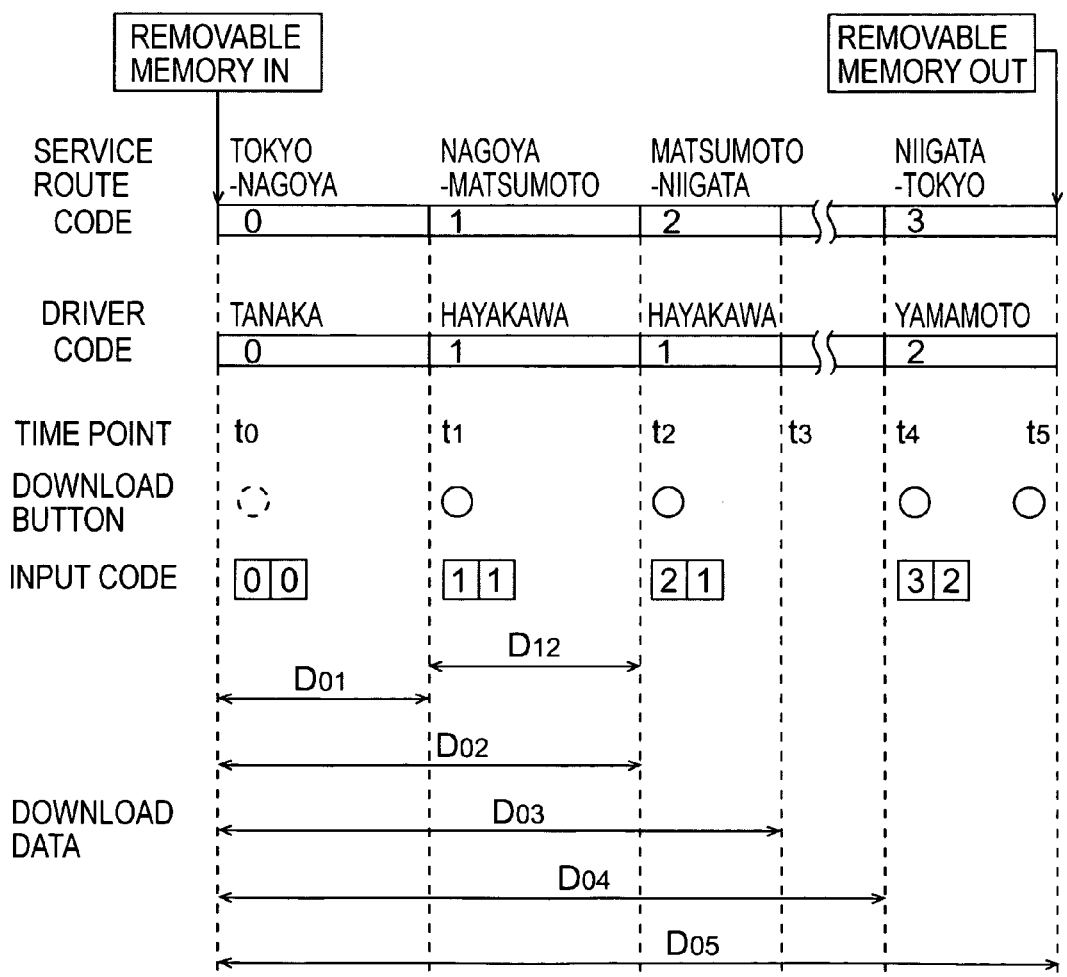
FIG. 4 shows examples of code settings.
FIG. 5 is a diagram for explaining the implementation of the present invention.

FIG. 4 shows examples of code settings. FIG. 4(1) shows an example of service route code settings. For example, code number "0" is assigned to the service route "Tokyo-Nagoya", while code number "1" is assigned to the service route "Nagoya-Matsumoto".

FIG. 4(2) shows an example of driver code settings. For example, code number "0" is assigned to the driver "Tanaka", while code number "1" is assigned to the driver "Hayakawa".

The quick setting button assembly 11 is equivalent to abbreviated dialing buttons of a phone, and allows code settings of a specific combination to be made with a single press of a button.

For example, if the driver Hayakawa often drives the vehicle 1 on the service route Matsumoto-Niigata, the combination of specific codes, that is, the driver=1 (Hayakawa) and the service route=2 (Matsumoto-Niigata) are stored in a button $P_1$ of the quick setting button assembly 11. Thus, code settings can be made with a single press of the button $P_1$, while many button presses are required for settings using the code setting buttons 8 and 9. Although three buttons $P_1$ to $P_3$ are included in the quick setting button assembly 11 in FIG. 1, the number of buttons may be more than that.

The code indicators 5 and 6, the code setting buttons 8 and 9, and a circuit (which is not shown since being a known circuit or being easily configured by those skilled in the art) operating in response to them constitute a code entry section.

In the example described above, the driver information and the service route information are examples of information to be set in code. However, the information for code settings is not limited to them. They may be changed, or other information may be added to them, depending on the perspective from which one desires to analyze the driving information.

For example, the entry of the driver information is mandatory, while the service route information may be replaced with sender information, loading ratio information, or information about driving time periods. Alternatively, three kinds of information, that is, the driver information, the service route information, and the sender information may all be entered (If one would like to increase the number of information to be entered by codes, the numbers of the code setting buttons and code indicators need to be increased, accordingly).

The download button 7 is a button for downloading the data stored in the predetermined data storage 3 into the removable memory 12. The data is downloaded with the addition of information corresponding to the codes set (information about a driver and service route) and clock information (downloading time) provided by the clock 10. The download button 7 and a circuit (which is not shown since being a known circuit or being easily configured by those skilled in the art) operating in response to the download button 7 constitute a download section.

In the present invention, a data recording method in the predetermined data storage 3 is a method for recording a large amount of data in a small storage, in other words, a recording method that can be referred to as a storage-saving-type data recording method.

Figure 2:
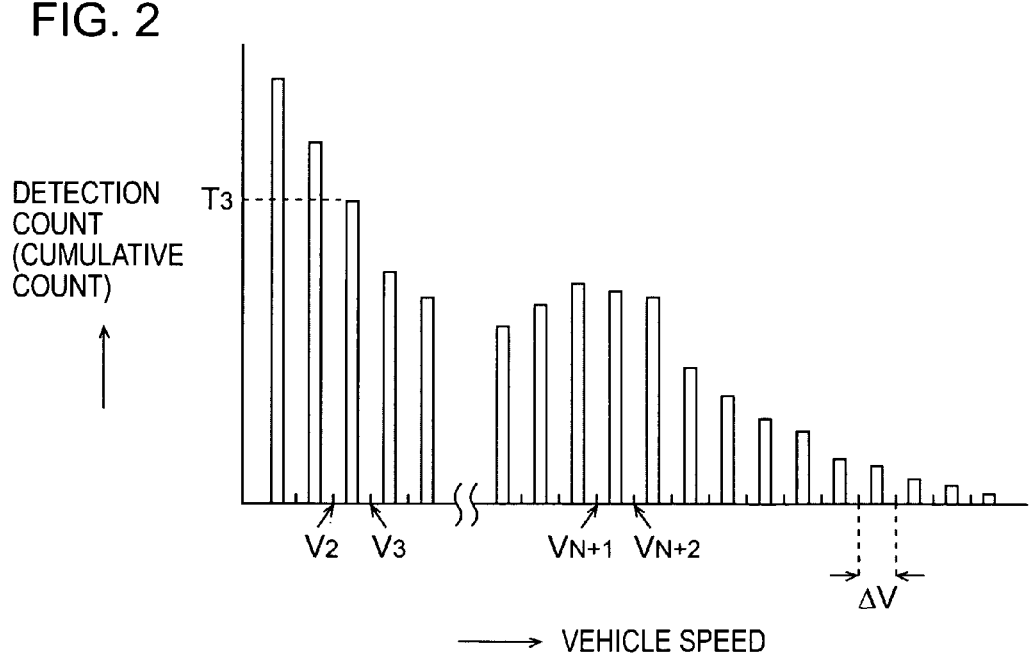
FIG. 2 is a diagram for explaining an example of a storage-saving-type data recording method.

FIG. 2 is a diagram for explaining an example of such a storage-saving-type data recording method. This is a diagram for explaining, in a way easy to understand, how to record vehicle speed data.

The horizontal axis indicates vehicle speeds and the vertical axis indicates detection counts (cumulative counts). The vehicle speeds ranging from low to high levels are divided at a predetermined speed interval of $\Delta V$ (for example, 5 km/h) into many vehicle speed ranges. In FIG. 2, each of the intervals between $V_2$ and $V_3$, and between $V_{N+1}$ and $V_{N+2}$ is $\Delta V$.

The vehicle speed is detected at every predetermined time interval (at every $\Delta t$), and the detection count of the vehicle speed range within which the detected vehicle speed falls is accumulated. For example, when the detection count of the vehicle speed range $V_2$-$V_3$ is $T_3$, and then the vehicle speed subsequently detected (in $\Delta t$ seconds) falls within the range of $V_2$-$V_3$, the detection count of the vehicle speed range increases to $T_3+1$ by the addition of one.

All that is required for such recording is, for example, to provide counters corresponding to each of vehicle speed ranges, in the predetermined data storage 3. When a vehicle speed is detected, a counter corresponding to the vehicle speed range within which the detected vehicle speed falls is incremented by one. Since only a storage capacity for the counters is required, the required storage capacity is significantly reduced compared to the case where a detected vehicle value itself is recorded each time. (Since counter value 1 is assumed to be equivalent to $\Delta t$ seconds in terms of time, an approximate cumulative time of travel in the vehicle speed range can be determined by multiplying the counter value by $\Delta t$ seconds).

Such a recording method can be referred to as a frequency-accumulation-type data recording method since the number of times a certain vehicle speed range is detected, in other words, the frequency of appearance of certain data is accumulated and recorded.

There are various types of storage-saving-type data recording methods other than the frequency-accumulation-type data recording method. For example, the storage capacity can be saved by recording data that is compressed through the use of a compression technique.

FIG. 5 is a diagram for explaining the implementation of the present invention. The driving of a vehicle from the insertion (at time point $t_0$ on the left) to the removal (at time point $t_5$ on the right) of the removable memory 12 is illustrated. The details will be described below in the order of time.

(1) Time point $t_0$ . . . The driver Tanaka gets into the vehicle and inserts the removable memory 12 into the data collection controller 4 in FIG. 1. There is no need for pressing the download button 7 at this point. If the download button 7 is pressed from habit at the time of getting into the vehicle, data present in the predetermined data storage 3 at this point is downloaded into the removable memory 12.

This poses no problem since the downloaded data is the same as that previously being downloaded to the removable memory 12, that is, since this is simply redundant storing of the same data (for convenience of explanation in FIG. 5, data is assumed to be empty at time point $t_0$).

Then the driver Tanaka enters his/her own driver code (0) and the code (0) for the service route "Tokyo-Nagoya" to drive (thus the input code is "00").

(2) Time point $t_1$ . . . Upon arrival in the destination Nagoya, the driver Tanaka gets out of the vehicle (without doing anything to operate the data collection controller 4). The next driver Hayakawa subsequently getting into the vehicle and presses the download button 7. This allows data ($D_{01}$) recorded in the predetermined data storage 3 at this point to be downloaded into the removable memory 12 (in this case, information, such as a driver code, service route code, and time, is added to be downloaded).

Moreover, the driver Hayakawa enters his/her own driver code (1) and the code (1) for the service route "Nagoya-Matsumoto" to drive (thus the input code is "11").

(3) Time point $t_2$ . . . Upon arrival in the destination Matsumoto, the driver Hayakawa can get out of the vehicle without doing anything, if not scheduled to continue driving. However, in this example, the driver Hayakawa is scheduled to subsequently drive the next service route "Matsumoto-Niigata". To start the next driving, the driver Hayakawa presses the download button 7 to allow data ($D_{02}$) in the predetermined data storage 3 to be downloaded into the removable memory 12, while entering his/her own driver code (1) and the code (2) for the service route "Matsumoto-Niigata" to drive (thus the input code is "21").

(Drivers who subsequently get into the vehicle perform the same operation to the data collection controller 4).

(4) Time point $t_4$ . . . To start the next driving, the driver Yamamoto who has got into the vehicle in Niigata presses the download button 7 to download data ($D_{04}$) in the predetermined data storage 3 into the removable memory 12, while entering his/her own driver code (2) and the code (3) for the service route "Niigata-Tokyo" to drive (thus the input code is "32").

If the driver Yamamoto arrives in the destination Tokyo (time point $t_5$) at the time to collect the removable memory 12 (for example, when one month has elapsed since the insertion of the removable memory 12, or at the end of month), the driver Yamamoto performs the operation for collection, such as those described in 1 and 2 below.

1. Press the download button 7 (to download data ($D_{05}$) in the predetermined data storage 3 into the removable memory 12).

2. Remove the removable memory 12.

The driver Yamamoto hands in the removed removable memory 12 to a service office (see a service office 14 in FIG. 3 to be described below).

Figure 6:
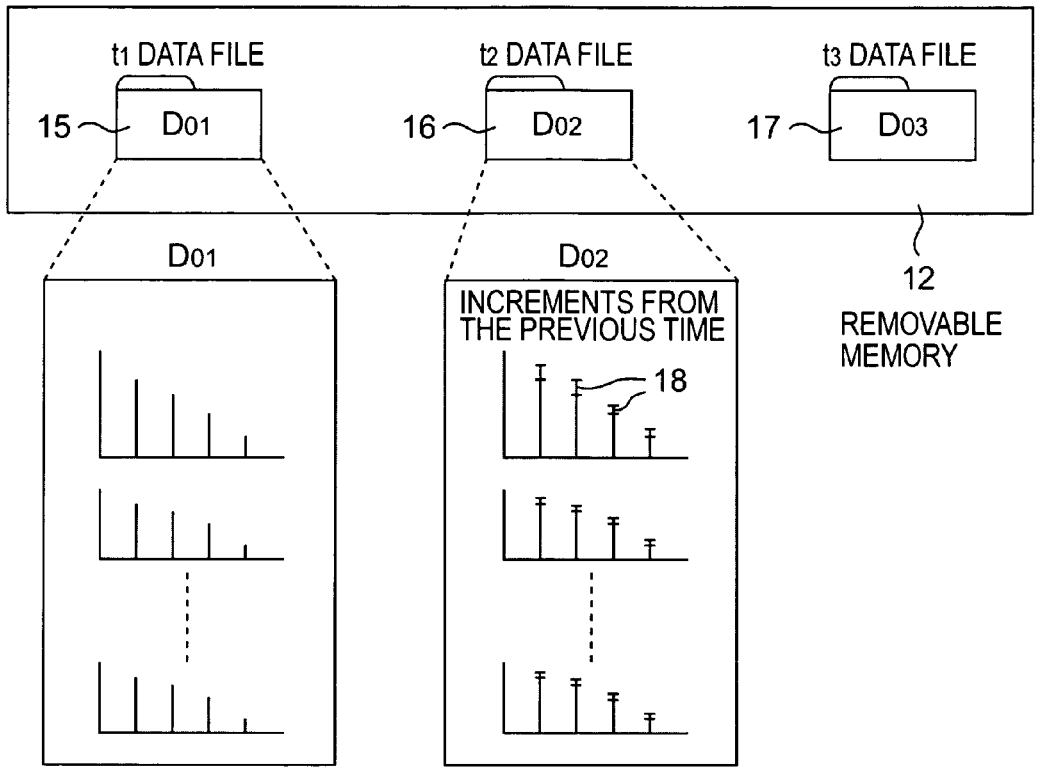
FIG. 6 illustrates the conditions of data downloaded to a removable memory.

FIG. 6 illustrates the conditions of data downloaded to the removable memory. Reference numeral 15 denotes a $t_1$ data file, reference numeral 16 denotes a $t_2$ data file, reference numeral 17 denotes a $t_3$ data file, and reference numeral 18 denotes increments from the previous time.

The data ($D_{01}$) in the predetermined data storage 3 downloaded at the time point $t_1$ shown in FIG. 5 is stored into the removable memory 12 in the form of a single file, which is the $t_1$ data file 15. The data $D_{01}$ contains many items, such as vehicle speeds and engine revolutions, that are recorded in the manner shown in FIG. 2.

The data ($D_{02}$) in the predetermined data storage 3 downloaded at the time point $t_2$ shown in FIG. 5 contains basically the same items. A difference is that the data detected during the period from the time points $t_1$ to $t_2$ is added to the data ($D_{01}$) at the time point $t_1$. This corresponds to the increments 18 from the previous time shown in FIG. 6.

The data detected during the period from the time points $t_1$ to $t_2$ (corresponding to data $D_{12}$ in FIG. 5, that is, the data for the driver Hayakawa driving the service route Nagoya-Matsumoto) can be determined by $D_{02}$–$D_{01}$ ($D_{02}$–$D_{01}$=$D_{12}$).

Figure 3:
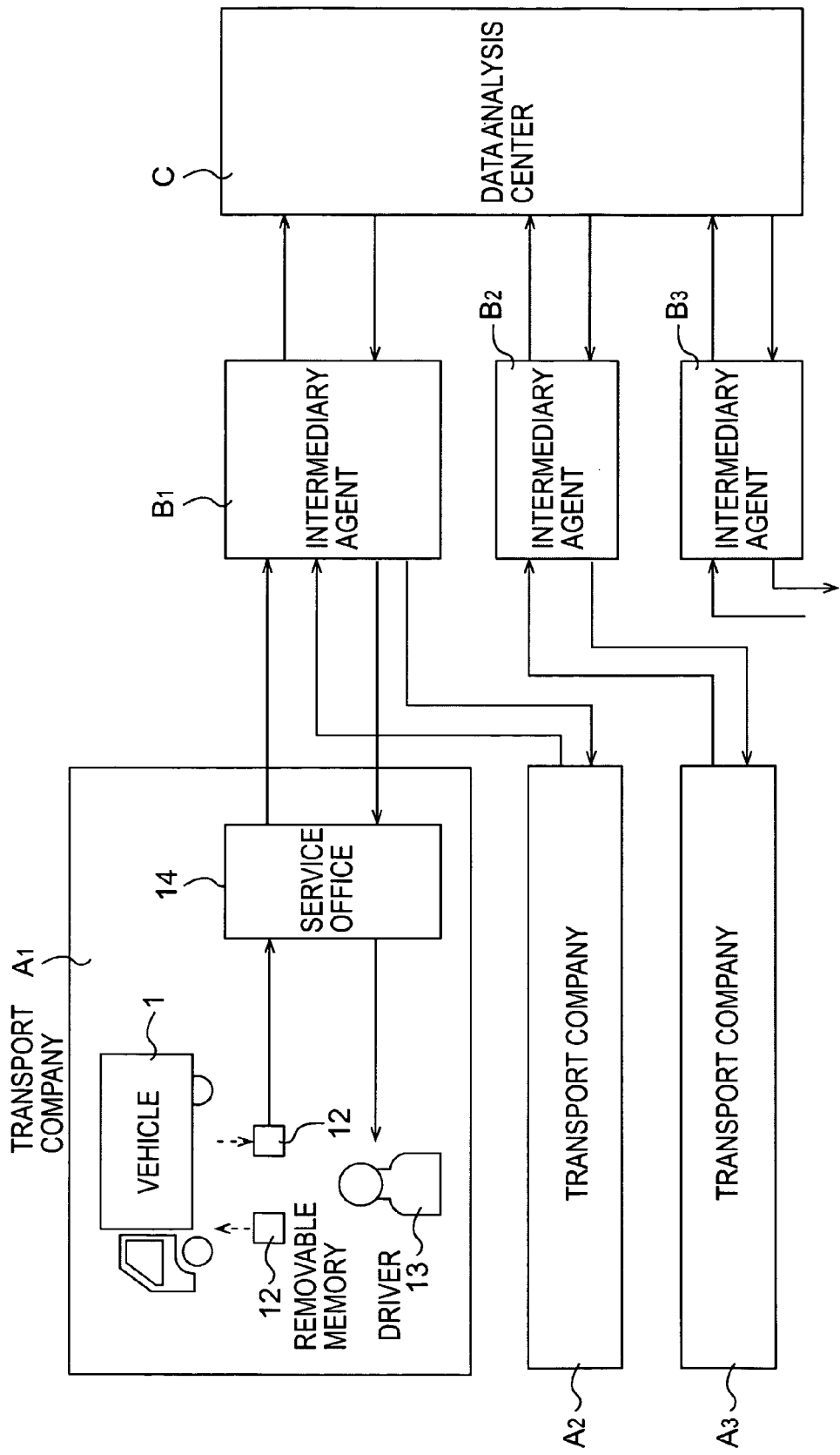
FIG. 3 is a diagram for explaining the flow of data analysis according to the driving information providing system of the present invention.

FIG. 3 is a diagram for explaining the route of data analysis according to the driving information providing system of the present invention. Reference numerals correspond to those in FIG. 1. Reference numeral 13 denotes a driver, reference numeral 14 denotes a service office, reference numerals $A_1$ to $A_3$ denote transport companies, reference numerals $B_1$ to $B_3$ denote intermediary agents, and reference numeral C denotes a data analysis center. The transport companies $A_1$ to $A_3$ are shown as examples of customers.

In the transport companies $A_1$ to $A_3$, the removable memory 12 is periodically (for example, once a month) collected from each vehicle 1. The removable memories 12 are collected at the service office 14 and sent to the intermediary agents $B_1$ to $B_3$ (or may be directly sent to the data analysis center C).

For data analysis of driving information, the intermediary agents $B_1$ to $B_3$ mediate between the transport companies $A_1$ to $A_3$, which are customers, and the data analysis center C. For example, dealers that have sold vehicles to the transport companies $A_1$ to $A_3$ also serve as such intermediary agents.

The data analysis center C analyzes driving information sent via the intermediary agents $B_1$ to $B_3$, or directly from the transport companies $A_1$ to $A_3$. The driving information from the intermediary agents $B_1$ to $B_3$ may be transmitted to the data analysis center C by the method of data transfer.

The results to be obtained by the analysis obviously depend on the type of data downloaded to the removable memory 12. Examples of the results are shown below.

For each vehicle, the results to be obtained include cost data (such as the amount of fuel consumption, fuel costs, and travel distances), environmental data (such as the amount of emissions of $CO_2$, $NO_x$, and PM), and driving time ratio (the ratio of driving time to idling time).

As for each driver, the results to be obtained include fuel costs, driving time, travel distances, the frequency and time of use of engine braking, the use of a foot brake (such as the frequency of hard braking), the number of engine revolutions in upshifting, cruising speeds, which gear is most frequently used during driving at what speed, and the frequency of hard acceleration.

As shown in FIG. 1, signals (data) appearing in the vehicle controller 2 can be downloaded into the removable memory 12 as much as required. Therefore, necessary data can be downloaded if specific analyses are required.

The analyses are sent back along the same route, which the driving information has been sent, in reverse order. When the analyses are received, the transport companies $A_1$ to $A_3$ can give proper guidance to each driver while calculating costs for each service route and each sender, based on detailed data obtained on each driver and each service route.

For example, specific guidance, such as to reduce hard braking or to reduce vehicle speed, can be given to a driver who frequently applies hard braking.

As for cost calculation for each service route, for example, the need for some level of price increase is considered for a route with many uphills, which cause large fuel consumption; and the change of starting time is considered, for cost reduction, for a route in which driving time varies greatly depending on the time of day (due to traffic congestion and so on).

Moreover, if codes for the types of goods loaded, senders, and the like are entered in the data collection controller 4, a detailed cost calculation for each goods loaded (or each sender) can be made. In this case, transportation charges can be changed depending on the goods loaded even if carried in the same service route.

As described above, in the driving information providing system of the present invention, time and effort required for collecting driving information can be reduced since it is done simply by collecting the small removable memories 12.

Data from the predetermined data storage 3 only allows for the analysis of vehicle data. However, since desired data can be added by code entry, analysis from new perspectives, such as the analysis for each desired data, can be made.

Moreover, the use of the storage-saving-type data recording method (for example, frequency-accumulation-type data recording method) in the predetermined data storage 3 allows a larger amount of data (that is, data for long periods of time) to be stored in a small-capacity storage.

When a plurality of data codes are entered, driving information can be analyzed from the corresponding number of perspectives. For example, when codes of driver data and service route data are entered, driving information can be analyzed from perspectives, such as for each driver, each service route, and each combination of them.

The invention claimed is:

1. A driving information providing system for collecting data for the analysis of driving information about a vehicle driven by an operator, comprising:
    a vehicle controller that receives detection signals carrying information about vehicle operation and operating signals from the operator, the vehicle controller generating control signals for controlling the vehicle;
    a predetermined data storage for storing predetermined data selected from data appearing in the vehicle controller;
    a removable memory; and
    a data collection controller that receives the predetermined data from the predetermined data storage, the data collection controller including at least a code entry section for entering desired data in code, and a download section having a download button for downloading data entered in code and data in the predetermined data storage into the removable memory when the download button is actuated, the removable memory being connectable to and detachable from the data collection controller,
    wherein the removable memory in which data is downloaded is collected and provided for the analysis of driving information, and
    wherein the data that is entered in code in the code entry section includes a driver code that distinguishes the operator of the vehicle from other vehicle operators.

2. The driving information providing system according to claim 1, wherein data is stored in the predetermined data storage by a storage-saving-type data recording method.

3. The driving information providing system according to claim 2, wherein a frequency-accumulation-type data recording method is adopted as the storage-saving-type data recording method, the frequency-accumulation-type data recording method being a method in which every time a data value detected at predetermined intervals falls within a predetermined range of data values, a detection count for the range is accumulated and recorded.

4. The driving information providing system according to claim 1, wherein a plurality of data is entered in code.

5. The driving information providing system according to claim 4, wherein data to be entered in code is at least two of driver data, service route data, sender data, goods data, loading ratio data, and data for driving time periods.

6. The driving information providing system according to claim 2, wherein a plurality of data is entered in code.

7. The driving information providing system according to claim 3, wherein a plurality of data is entered in code.

8. The driving information providing system according to claim 6, wherein data to be entered in code is at least two of driver data, service route data, sender data, goods data, loading ratio data, and data for driving time periods.

9. The driving information providing system according to claim 7, wherein data to be entered in code is at least two of driver data, service route data, sender data, goods data, loading ratio data, and data for driving time periods.

10. The driving information providing system according to claim 1, wherein the data entered in code includes data identifying different drivers.

11. The driving information providing system according to claim 1, wherein data pertaining to a given parameter of vehicle operation is stored in the predetermined data storage by a frequency-accumulation-type data recording method, in which possible values for the given parameter are divided into ranges, actual values for the given parameter are detected at predetermined time intervals, and every time an actual value that lies within one of the ranges is detected, a count value corresponding to said one of the ranges is incremented.

12. The driving information providing system according to the claim 1, wherein the detection signals received by the vehicle controller include engine-revolution detection signals and vehicle-speed detection signals.

13. The driving information providing system according to claim 12, wherein a vehicle operating signals received by the vehicle controller include at least one of acceleration operating signals, brake operating signals, and gear shift operation signals.

14. The driving information providing system according to claim 1, wherein the operating signals received by the vehicle controller include at least one of acceleration operation signals, brake operation signals, and gear shift operation signals.

15. The driving information providing system according to claim 1, wherein the operating signals received from the vehicle controller include acceleration operation signals, brake operation signals, and gearshift operation signals.

16. The driving information providing system of claim 1, wherein the code entry section comprises at least one manually operable button for entering the desired data in code.

17. A driving information providing system for collecting data for the analysis of driving information about a vehicle driven by an operator, the vehicle having a vehicle controller that receives detection signals carrying information about vehicle operation and operating signals from the operator, the vehicle controller generating control signals for controlling the vehicle, said driving information providing system comprising:
  a predetermined data storage for storing predetermined data selected from data appearing in the vehicle controller;
  a removable memory; and
  a data collection controller that receives the predetermined data from the predetermined data storage, the data collection controller including at least a code entry section for entering desired data in code, and a download section having a download button for downloading data entered in code and data in the predetermined data storage into the removable memory when the download button is actuated, the removable memory being connectable to and detachable from the data collection controller,
  wherein the removable memory in which data is downloaded is collected and provided for the analysis of driving information, and
  wherein the desired data that is entered in code in the code entry section includes a driver code that distinguishes the operator of the vehicle from other vehicle operators.

* * * * *